United States Patent [19]
Carr et al.

[11] Patent Number: 5,375,277
[45] Date of Patent: Dec. 27, 1994

[54] COLLAPSIBLE EXTRICATION DEVICE

[75] Inventors: Walter Carr, Dayton; Jerry L. Taylor, Greenfield, both of Ohio

[73] Assignee: Ferno-Washington, Inc., Wilmington, Ohio

[21] Appl. No.: 105,896

[22] Filed: Aug. 11, 1993

[51] Int. Cl.⁵ .......................... A61C 1/02; B62B 1/00
[52] U.S. Cl. ............................................ 5/625; 5/626; 5/628; 280/47.25; 297/129
[58] Field of Search .................... 5/625–628; 280/47.17, 47.24, 47.25, 47.315; 297/129

[56] References Cited

U.S. PATENT DOCUMENTS

| | | |
|---|---|---|
| Re. 28,620 | 11/1975 | Jordan et al. |
| 677,673 | 7/1901 | Mahan. |
| 1,903,536 | 4/1933 | Skinner. |
| 2,224,087 | 12/1940 | Reichert ................................ 5/625 |
| 2,328,047 | 8/1943 | Anderson et al. ..................... 5/627 |
| 2,362,721 | 11/1944 | Reynolds ...................... 280/47.25 X |
| 2,517,443 | 8/1950 | Rhodes et al. ......................... 5/625 X |
| 2,699,557 | 11/1955 | Gravatt ................................. 5/626 |
| 3,122,758 | 3/1965 | Furneau ................................ 5/626 |
| 3,227,467 | 1/1966 | Fugitt, Sr. ....................... 280/47.25 |
| 3,271,796 | 9/1966 | Dillman. |
| 3,671,983 | 6/1972 | Bertolet. |
| 3,921,231 | 11/1975 | Bourgraf et al. |
| 4,037,871 | 7/1977 | Bourgraf et al. |
| 4,060,079 | 11/1977 | Reinhold, Jr. |
| 4,136,888 | 1/1979 | Bowie, Jr. et al. .......... 280/47.25 X |
| 4,470,610 | 9/1984 | Wilson. |
| 4,733,905 | 3/1988 | Buickcrood et al. ........ 280/47.25 X |
| 4,826,196 | 5/1989 | Kirkpatrick et al. |

FOREIGN PATENT DOCUMENTS

| | | | |
|---|---|---|---|
| 520711 | 9/1940 | United Kingdom ..................... 5/625 |
| 735613 | 8/1955 | United Kingdom ..................... 5/626 |
| 2234442 | 2/1991 | United Kingdom ..................... 5/626 |

Primary Examiner—Michael F. Trettel
Attorney, Agent, or Firm—Frost & Jacobs

[57] ABSTRACT

A personal extraction cart for supporting and restraining a person to facilitate movement of that person from an extrication point, wherein the cart includes a frame having a support surface. The support surface has upper and lower faces and a leg support portion and a back support portion defining a longitudinal length with oppositely disposed longitudinal edges. The leg and back support portions have a use position in which the upper faces of each of those portions are angled relative to each other along the longitudinal length of the frame. Wheels are preferably attached below the support surface for facilitating movement of the cart in its transportation position. In a preferred embodiment, a pair of oppositely disposed roll shields are provided below the upper face of the support surface for facilitating rolling of the cart between an upright transportation position where the wheels are engaged for movement, and a loading position where the cart is at least partially supported along one of the longitudinal edges. In loading position, the cart can be placed next to a person in generally prone position to facilitate loading of that person onto the support surface of the cart. Thereafter, the cart is rolled to its upright or transportation position for easy movement on its wheels.

20 Claims, 6 Drawing Sheets

COLLAPSIBLE EXTRICATION DEVICE

TECHNICAL FIELD

This invention relates to wheeled devices for facilitating the removal or extrication of passive demonstrators, handcuffed arrestees, or the like, and, more particularly, to a collapsible, light-weight wheeled cart which can be placed next to a person in prone position for loading, then rolled to a transportation position for convenient movement of such person. The design of the cart simultaneously provides anatomical accommodations with mechanical advantages for facilitating handling of the extrication procedures with less manpower requirements.

BACKGROUND OF THE INVENTION

In law enforcement and emergency medical situations, it is often necessary for the removal or extrication of persons from an area. Examples of these situations include passive demonstrations, strike situations, and the like, where the arrest and/or removal of persons from particular premises is desired. In such situations, there is often required a number of law enforcement or emergency medical personnel to move such demonstrators, even if virtually no resistance is met. Such procedures can be time consuming, labor and personnel intensive, and physically demanding for those involved.

There have been a number of stretcher and stretcher-type devices available over the years for various applications. For example, a break-away stretcher and extrication device is shown in U.S. Pat. No. 3,921,231, which issued to Elroy E. Bourgraf et al. While the foldable chair and break-away stretcher structures shown and disclosed in the Bourgraf et al. patent are extremely helpful in a wide variety of immobilization, extrication and/or transportation situations, their design is more applicable to critically injured persons requiring immobilization and extrication from accident situations and the like.

Similarly, the stretcher and stretcher chairs shown in U.S. Pat. Nos. 677,673 (Mahan) and 3,271,796 (Dillman) provide other examples of medically-related structures including immobilization and/or restraint-type straps and the like. Additional carrying devices include those shown in U.S. Pat. Nos. Re. 28,620 (Jordon et al.) and 1,903,536 (Skinner). While each of these devices certainly has applicability for restraint and movement of medical patients and accident victims, their application in the situations contemplated herein are no better than the multitude of other medical stretchers, gurneys, cots and the like which have been available in various forms over the years.

Consequently, heretofore there has not been available a relatively simple, light-weight and adaptable structure designed to accommodate and restrain persons who have been arrested and/or who need to be removed from a location, such as passive demonstrators and the like. Most of the structures mentioned above, and others which have been known and/or available in the industry, require a plurality of medical and/or law enforcement personnel for their proper use. Moreover, many of these devices are relatively complex, expensive, and cumbersome for storage and transportation to a demonstration site or the like. There was not available a device designed to accommodate a person in substantially seated position, and, most likely, with their hands bound behind their backs, and which could be easily utilized to extricate a person from a substantially prone position.

SUMMARY OF THE INVENTION

It is an object of the present invention to provide an extrication device which addresses and overcomes the problems and shortcomings of devices heretofore available in the industry.

It is also an object of the present invention to provide a personal extrication cart for supporting and restraining a person to facilitate movement of that person in a secure and relatively simple manner.

It is another object of the present invention to provide a single person extrication device for passive demonstrators and the like which is designed to be rolled between a loading position, wherein a person to be moved can be easily loaded from a substantially prone position, to a transportation position where the cart is generally supported by one or more wheels.

It is yet another object of the present invention to provide a collapsible, light-weight extrication device for passive demonstrators and the like which includes an anatomical design to accommodate a demonstrator with their hands bound behind their back, and to maintain that person in a restrained condition for extrication procedures.

It is also an object of the present invention to provide an extrication device for passive demonstrators and the like which includes a novel design which facilitates the transition between loading and transportation positions of the cart, and facilitates use of the cart by a single worker.

In accordance with one aspect of the present invention, there is provided a personal extraction cart for supporting and restraining a person to facilitate movement of that person from an extrication point, wherein the cart includes a frame having a support surface for supporting the person to be moved. The support surface has upper and lower faces, and a leg support portion and a back support portion defining a longitudinal length with oppositely disposed longitudinal edges. The leg and back support portions have a transportation position in which the upper faces of each of those portions are angled relative to one another along the longitudinal length of the frame. Wheels are preferably attached below the support surface to facilitate movement of the cart in its transportation position. In a preferred embodiment, a pair of oppositely disposed roll shields are provided below the upper face of the support surface and on the outside of cart wheels for facilitating rolling of the cart between an upright condition, where the wheels are engaged for movement, and a loading condition, where the cart is at least partially supported along one of the longitudinal edges. In loading condition, the cart can be placed next to a person in generally prone position to facilitate loading of that person onto the support surface of the cart. Thereafter, the cart is rolled to its upright or transportation position for easy movement on its wheels.

In a preferred embodiment, the extrication cart further includes a recessed area formed adjacent the lower edge of the back support portion to anatomically accommodate a person thereon with both hands being situated behind their back and adjacent to the back support portion. This anatomical design enables the use of the cart with persons having their hands bound (e.g., handcuffed) behind their back while minimizing potential for injury.

BRIEF DESCRIPTION OF THE DRAWINGS

While the specification concludes with claims particularly pointing out and distinctly claiming the extrication device of the present invention, it is believed that this invention will be better understood from the following discussion referring to the attached drawings in which:

DETAILED DESCRIPTION OF THE INVENTION

Figure 1:
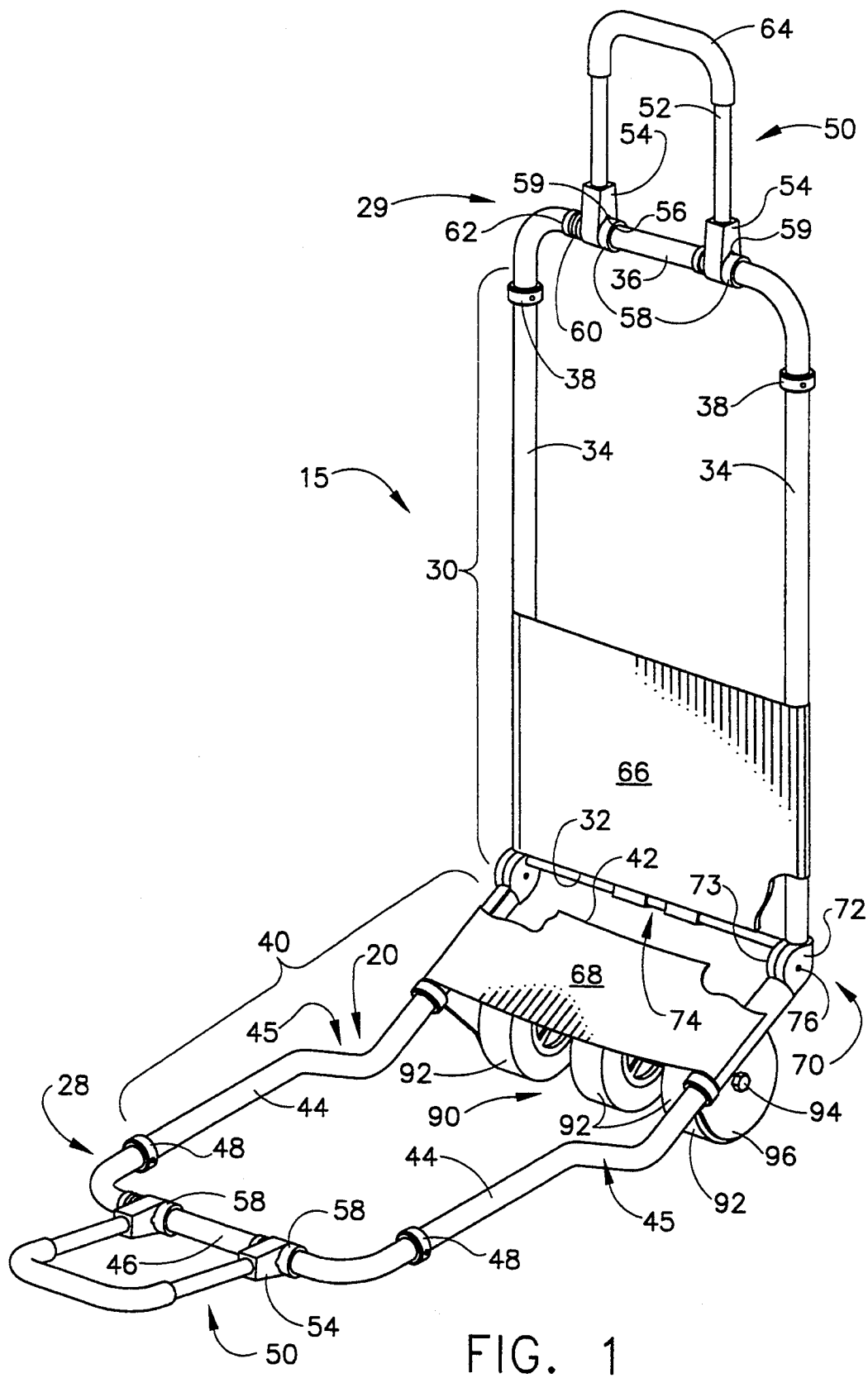
FIG. 1 is a front, right, top perspective view of the frame portions of a personal extrication cart made in accordance with the present invention, shown without its support surface cover for clarity.

Turning now to the drawings in detail, wherein like numerals indicate the same elements throughout the views, FIGS. 1-7 illustrate a preferred embodiment of a personal extrication cart 15 made in accordance with the present invention. Particularly, extrication cart 15 preferably comprises a substantially skeletal frame 20 defined by a plurality of substantially tubular frame members interconnected to form an outer peripheral edge as shown. Frame 20 is further illustrated as including a leg support portion 30 and a back support portion 40, preferably connected adjacent their oppositely disposed transverse edges 32 and 42, by a pair of hinged connections 70, which will be described in greater detail below.

Figure 2:
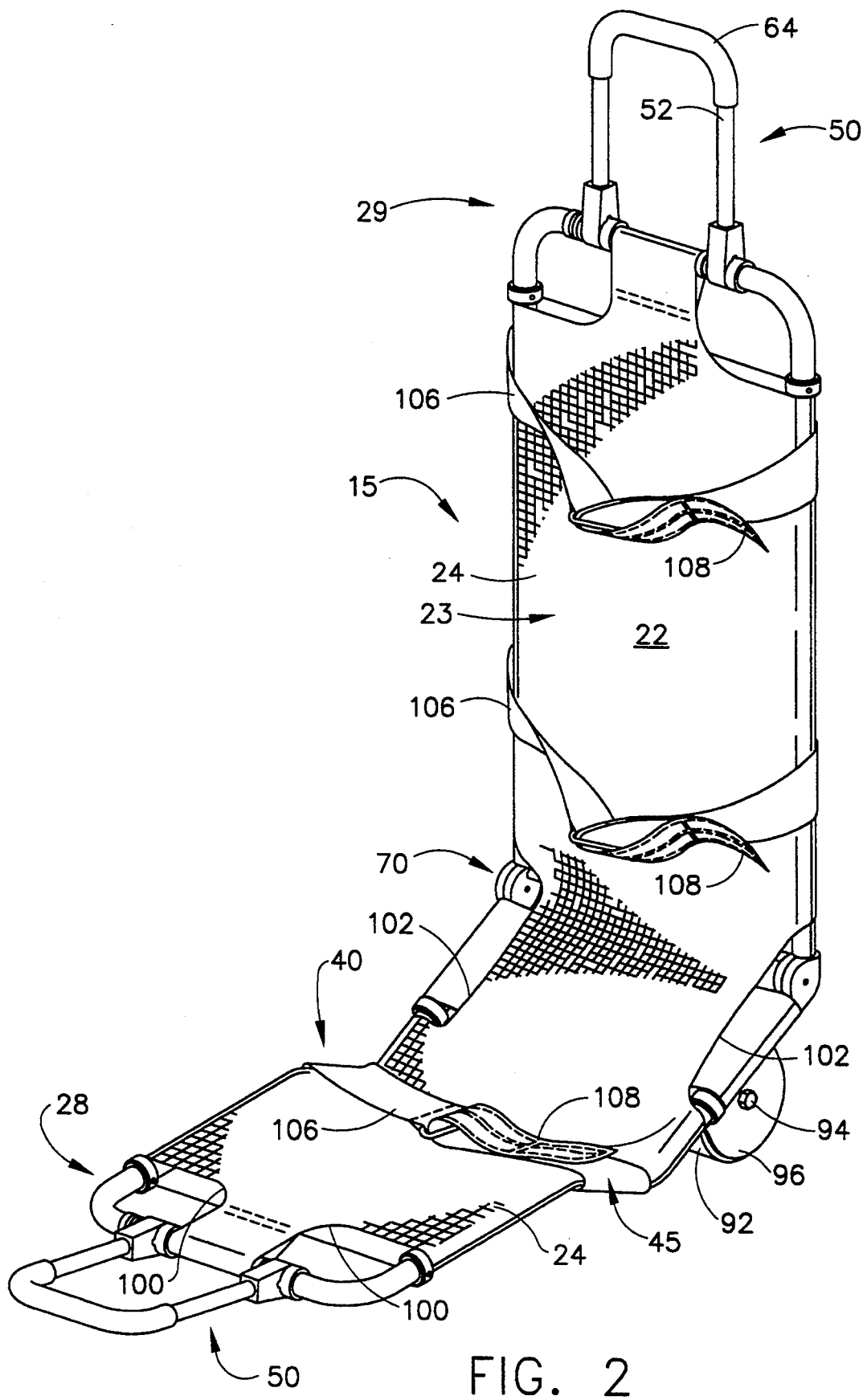
FIG. 2 is a perspective view similar to that shown in FIG. 1, but including a preferred support surface cover and retention straps.

As best seen in FIG. 2, frame 20 further includes a support surface 22 which can be provided in the form of a removable cover member 23 mounted over the skeletal frame 20. Support surface 22 includes an upper face 24 and a lower face 26, and frame 20 generally defines a support surface with an upper longitudinal end 28 and a lower longitudinal end 29 spaced along its longitudinal length. As illustrated, frame 20 preferably provides an articulated structure with a longitudinal length which is considerably greater than its transverse width.

Leg support portion 30 of frame 20 is illustrated as comprising one or more tubular frame members such as the oppositely disposed longitudinal side elements 34, and the generally U-shaped end frame member 36 attached with side elements 34 by a pair of connection collars 38. While leg support portion 30 might be provided in the form of a unitary U-shaped member, use of a plurality of interconnected pieces as illustrated may facilitate manufacturing and/or assembly procedures. It is contemplated that the side elements 34 and end frame member 26 may be conveniently provided with flared male/female ends for telescoping attachment, while the collars 38 may provide a pinned connection therebetween.

Figure 4:
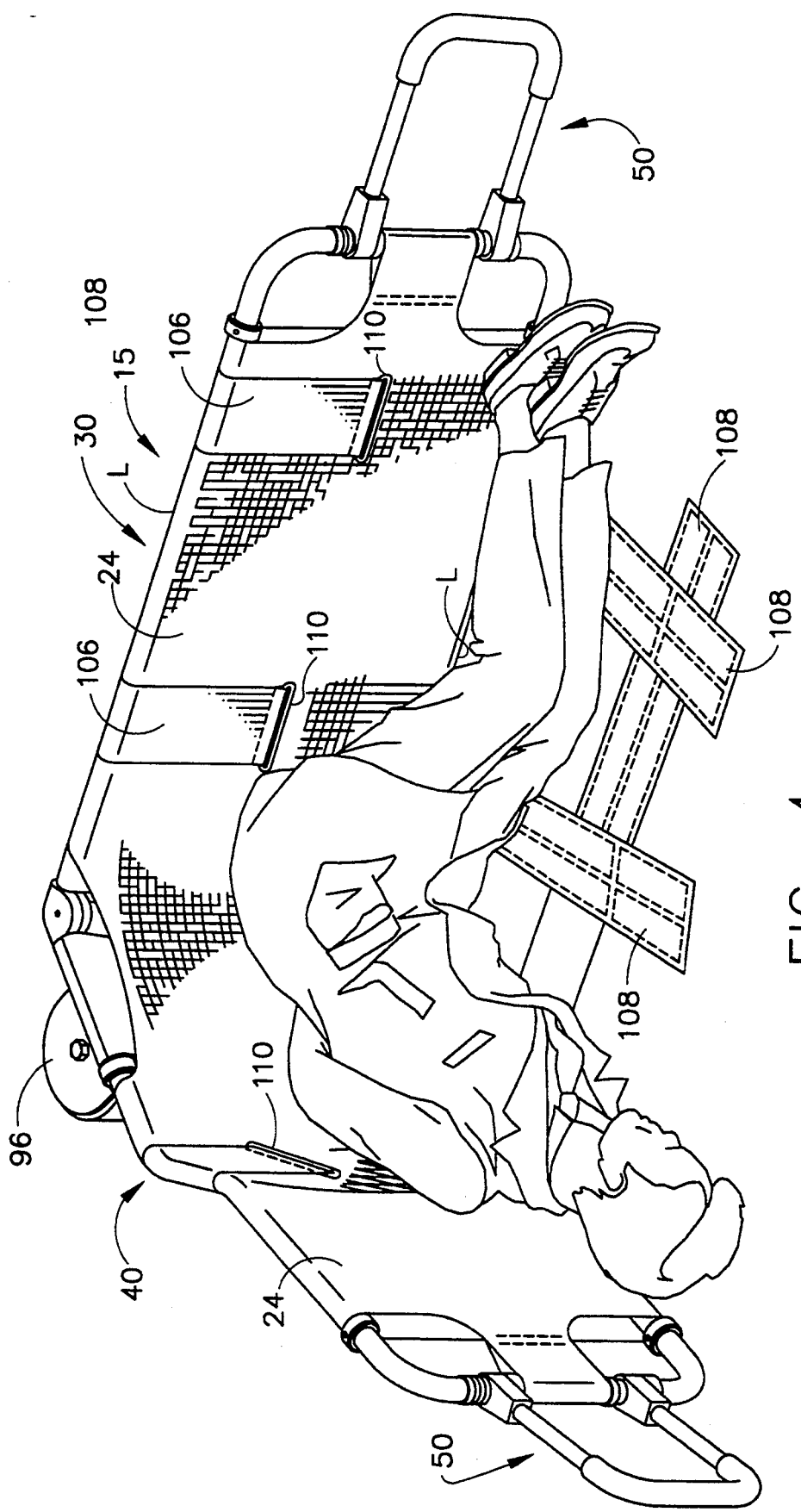
FIG. 4 is a perspective view of the cart of FIGS. 1-3 shown in a loading position behind a person in generally prone position.
Figure 6:
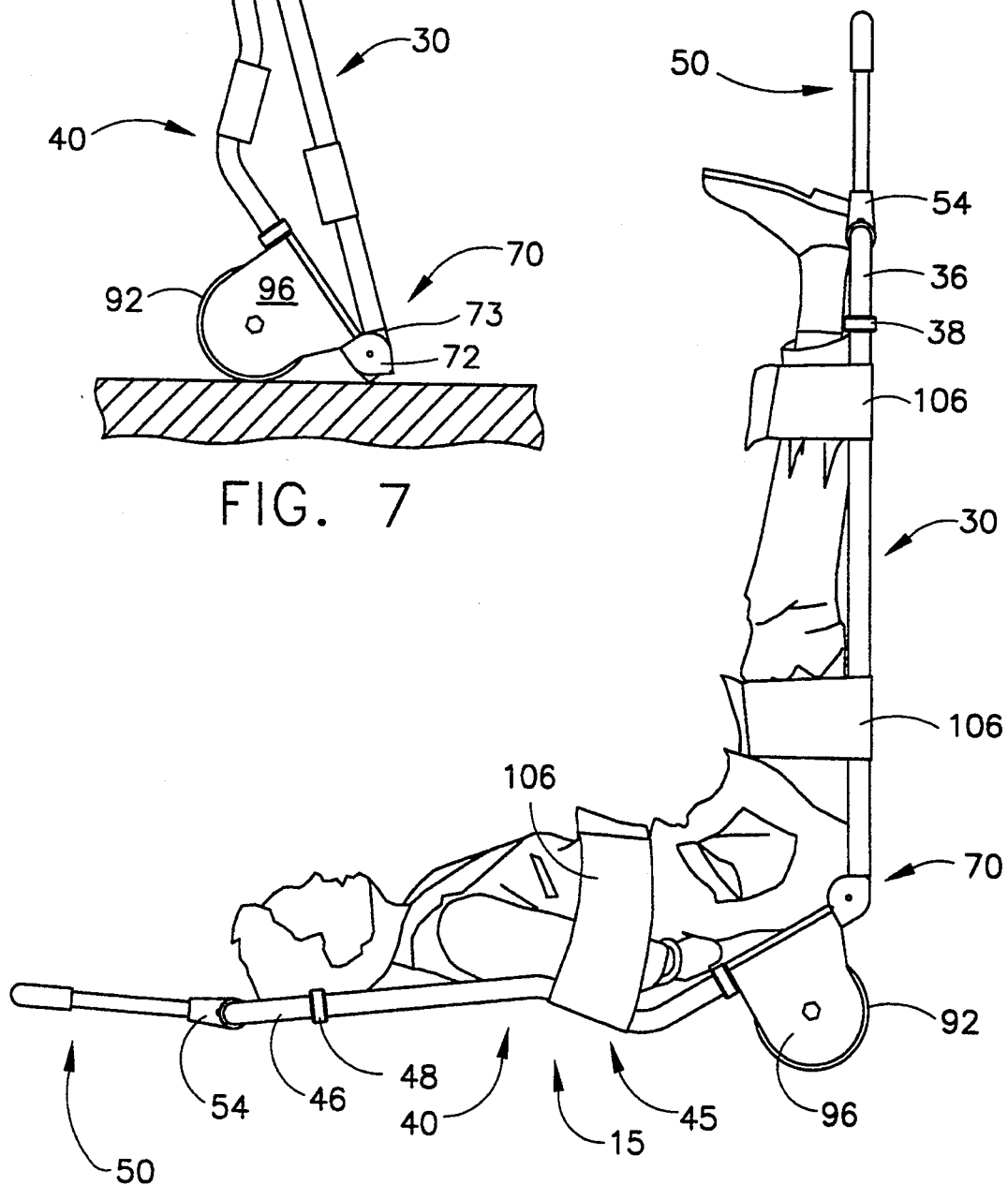
FIG. 6 is a right side elevational view of the cart of the present invention, in its transportation position, and illustrating the restraining characteristics for reliable transportation of a person thereon.

Similarly, back support portion 40 is illustrated as including one or more tubular frame members, such as longitudinal side elements 44, end frame member 46, and connection collars 48. It should also be noted that back support portion 40 further preferably comprises a recessed area formed adjacent transverse edge 42 and defined by the outwardly bent portions 45. As will be appreciated, recess 45 provides anatomical accommodation of a person on the upper face 24 of extrication cart 15 with their hands bound behind their back (as best seen in FIGS. 4 and 6) while minimizing discomfort and/or injury.

A pair of oppositely disposed collapsible/extensible handles 50 are preferably mounted on end frame members 36 and 46, respectively. Each of the handles 50 comprises at least two orientations, such as the use or extended condition shown in FIGS. 1, 2 and 4-6, and the collapsed or storage condition best seen in FIGS. 3 and 7. The U-shaped handle 52 is preferably rotatably attached to the end frame member via a pair of rotation collars 54, and can be provided with a plurality of selective positions by the combination of one or more locking recesses (e.g., 56) and corresponding locking detents (e.g., 59). As illustrated, rotation collars include a locking recess 56, while the fixed locking collars 58 include one or more detent 59. Handles 50 are normally urged toward their locked condition by a biasing means, such as spring 60, which is maintained in place by a spring key 62. It will be understood that the collapsible/extensible handles 50 could be provided in a variety of structural configurations, and can be selectively locked and moved between various positions by any of a variety of structures known or reasonably available in the industry. The biased recess/detent arrangement illustrated is preferred, but is not critical to the present invention. Handles 50 may also preferably include an additional handle means such as pad 64.

As best illustrated in FIG. 1, a semi-rigid seat support 66 extends across portions of side elements 34 adjacent transverse edge 32. Such a rigidifying member can be helpful in providing additional support to extrication cart 15 below the buttocks area of a supported person in use. It is contemplated that seat support 66 may be provided in the form of a semi-rigid structure (e.g., aluminum sheet material) which can also provide additional overall rigidity to cart 15. A similar semi-rigid back support member 68 is also preferably provided as spanning between the longitudinal side elements 44 of back support portion 40, adjacent transverse edge 42. Like seat support 66, back support 68 can provide additional rigidity to the structure, and can further ensure that a person supported on support surface 22 is positively isolated from the moving part of cart 15, such as wheels 92, as will be discussed below.

Figure 3:
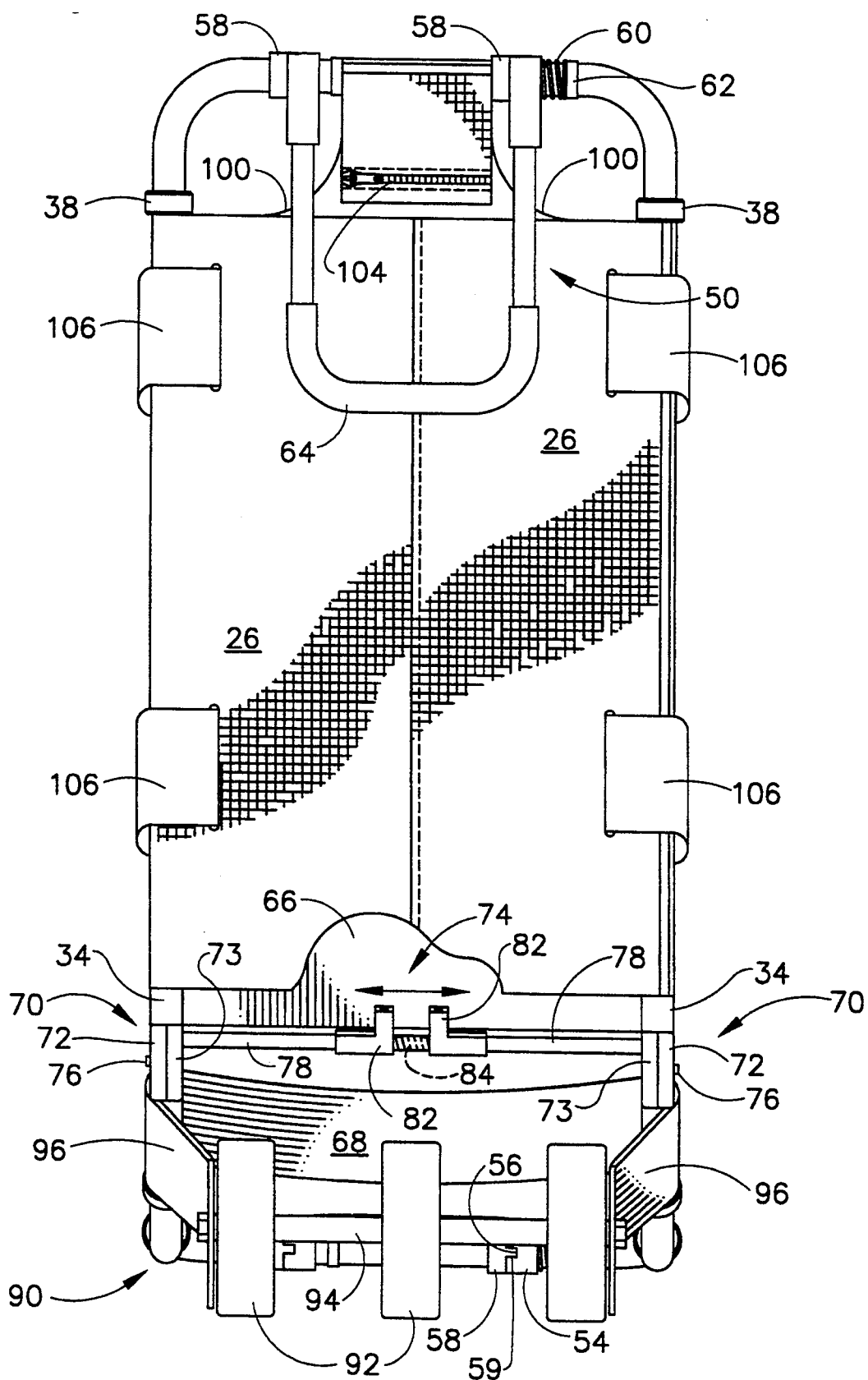
FIG. 3 is a rear elevational view of the cart of FIG. 2, shown with its folding handle in collapsed condition.

As mentioned above, in order to provide extrication cart 15 as a collapsible structure, it is preferred that leg support portion 30 and back support portion 40 be connected in a hinged manner, such as via hinged connections 70. As best seen in FIGS. 1-3, hinged connections 70 preferably comprise a pair of hinge halves 72 and 73, respectively, rotatably connected via a pin/axis of rotation 76. As also seen in FIGS. 1, outer hinge half 72 may preferably be connected directly to alternate opposite ends of the longitudinal side elements 34 and 44, respectively.

Figure 7:
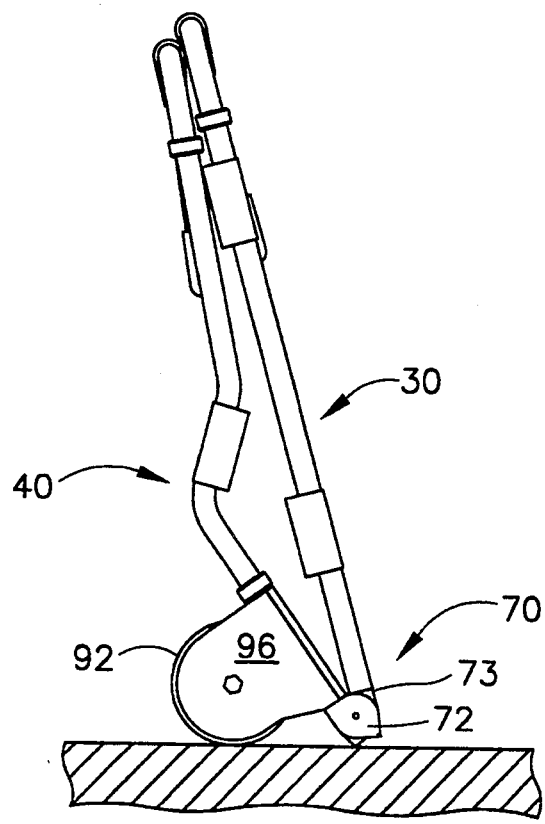
FIG. 7 is a right side elevational view of the cart of the figures, shown in its compact storage condition.

As best illustrated in FIG. 3, it is also preferred to include a locking/release mechanism 74 which enables selective locking and release of hinged connections 70 in order to enable cart 15 to be opened and/or collapsed for alternate storage/transportation and use, as desired. FIGS. 1 and 2 show cart 15 in its use or opened condition, while FIG. 7 illustrates cart 15 in its collapsed or storage condition. Locking/release mechanism 74 is illustrated as including a pair of outwardly biased locking rods 78 whose outer ends pass through the inner half 73 of hinged connections 70, and selectively lock into outer half 72 to prevent movement when in locked condition. A pair of release levers 82 are provided near the central portions of mechanism 74 adjacent the lower face of support surface 22. A biasing means 84 tends to keep the locking rods 78 biased outwardly toward their locked condition.

In use, release levers 82 can be squeezed together to effectively release hinged connections 70 and to enable rotation about axis 76, thereby permitting movement of the leg and back support portions (30 and 40) between collapsed and use condition. The particular arrangement of the locking/release mechanism shown in the drawing figures can be substituted with other selective locking arrangements as appropriate, and the particular structures shown are by way of example only. As best seen in FIG. 6, the use position of hinged connections 70 effectively locks leg support portion 30 in a substantially vertical condition, while back support portion 40 is locked in a generally horizontal condition. The resultant angle (A) between the leg and back support portions of cart 15 provides a support surface 22 which accommodates a person in generally seated position.

Wheel means 90 is preferably attached below support surface 22 for facilitating movement of cart 15 when in transportation position. As best illustrated in FIG. 3, wheel means 90 preferably comprises a plurality of spaced wheels 92 rotatably attached along axle 94 between a pair of spaced-apart roll guides or shields 96. Particularly, at least one roll guide 96 is provided to facilitate rolling of cart 15 between an upright position (as seen in FIGS. 1, 2 and 6), where the wheels 92 contact the ground or other surface S for rotational movement, and a loading position (as best seen in FIG. 4), wherein cart 15 is at least partially supported along one of the longitudinal edges L of frame 20.

As will be appreciated, in loading position, wheels 92 will be generally out of contact with the ground. As illustrated in FIG. 4, in loading position, the cart 15 can be placed directly behind a person to be extricated, who will be in generally prone position with their hands bound behind their back (e.g., handcuffed). Restraint straps 106 are provided with opposite free ends (e.g., 108) which can be selectively, adjustably, and releasably attached to one another, such as with releasable hook and loop material, buckles, snaps, or other securing means.

Figure 5:
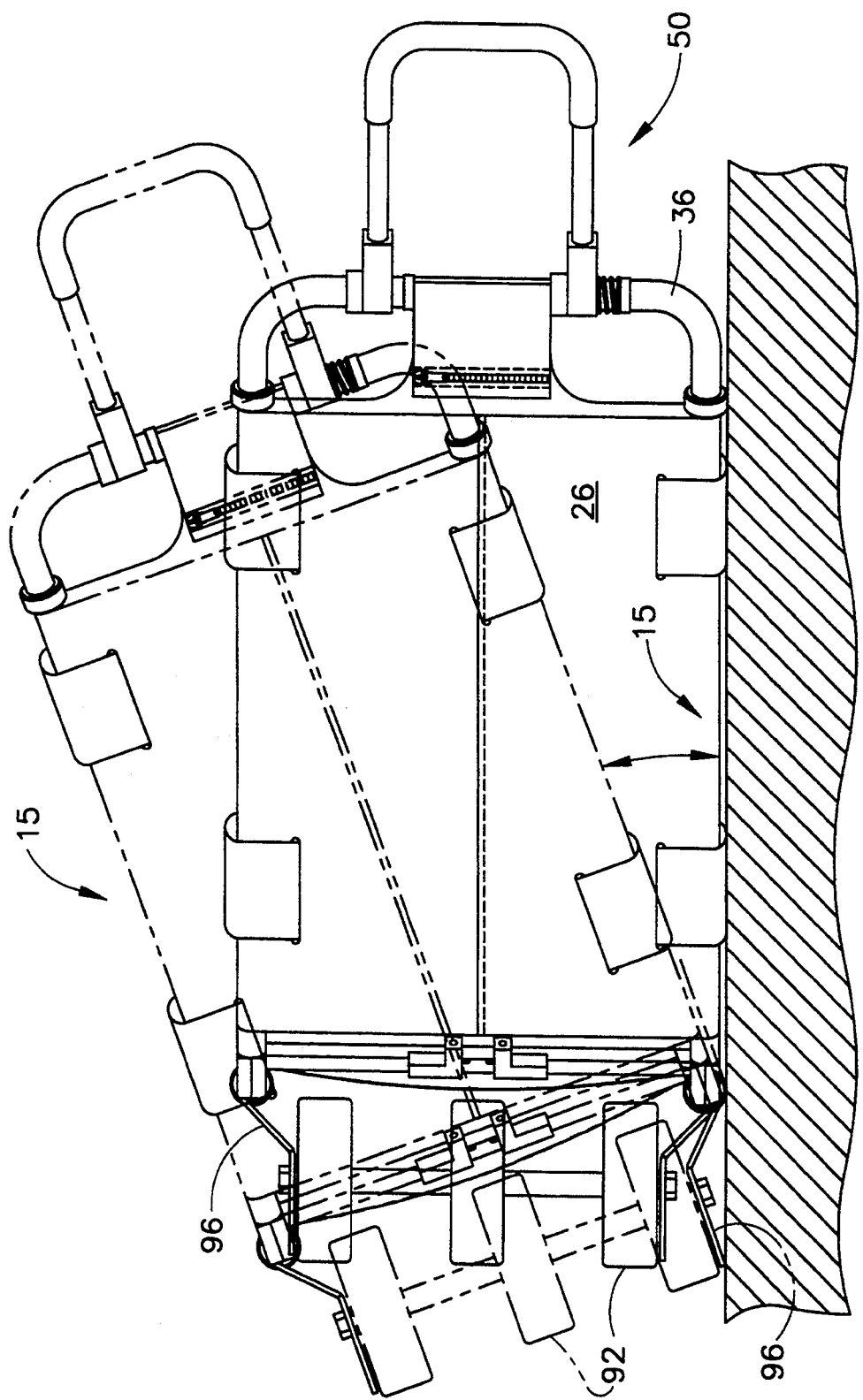
FIG. 5 is a partial rear elevational view illustrating the rolling procedure for moving the cart between its loading and transportation positions.

In use, the free ends of restraint straps 106 are extended below the person to be extricated as cart 15 is situated directly behind that person, as illustrated in FIG. 4. Thereafter, the free ends of the restraint straps are attached to one another in snug condition to effectively hold the person against upper face 24 of support surface 22. One of the free ends of straps 106 may also preferably include a rigid loop (e.g., 110) through which the other free end can be passed to assist in "cinching" the strap tight before affixing the free ends together. In the case where a rigid loop 110 is utilized, the other free end of strap 106 (e.g., 108) might include means (e.g., hook and loop material, snaps, etc.) for securing free end 108 to itself after being passed through loop 110 and tightened over the person. Once the person to be extricated has been snugly strapped to upper face 24 of cart 15, the cart can be rolled from its loading position to its upright or transportation position. As illustrated in FIG. 5, this rolling procedure is accommodated by the shape and location of roll shield 96, which facilitates a smooth transition or rolling action between loading position (FIG. 4) and transportation position (FIG. 6). Roll shield 96 effectively isolates and protects wheels 92 from damaging lateral forces inherent in the rolling procedure, while allowing the smooth and stable transition between loading and transportation positions.

It should also be noted that by restraining a person with their feet in generally upward condition (see FIG. 6), a relatively large portion of the person's weight will be maintained close to the ground at all times. This arrangement also facilitates the rolling procedures between loading position and transportation position. Particularly, a user can incorporate a "lever" type action of the length of leg support portion 30 working against a pivot point provided by roll guide or shield 96 by grasping cart 15 adjacent end frame member 36 or by grasping handle 50 attached to end frame member 36. This mechanical advantage simplifies use of the subject cart without undermining the structural integrity thereof. As mentioned, roll guide 96 also prevents damage which might be imposed on wheels 92 if the wheels themselves had to withstand the rolling action of cart 15 between its loading and transportation position.

Once rolled from its loading position to the upright position shown in FIG. 6, cart 15 can be pushed or pulled via handle 50 attached to end frame member 36, and transportation of the restrained person can be accomplished by a single user. As will be appreciated, the second handle attached adjacent end frame member 46 can enable assistance by a second user in rolling cart 15 between its loading and transportation positions, and can facilitate lifting of the cart 15 with a restrained person held thereon over obstacles or into a transportation vehicle, as needed.

As also seen in FIGS. 1-3, cover member 23, which is to be mounted over frame 20, may have a plurality of cutouts (e.g., 100 and 102) to facilitate its incorporation with frame 20 without interfering with moving parts and the like. It will also be recognized that cutouts 100 can facilitate the provision of effective "hand holds" to further simplify handling of cart 15 in use. While cover member 23 can comprise one or more rigid or semi-rigid members, it is preferred that such cover member be provided in the form of a relatively flexible and removable cover piece. As can be seen in FIG. 3, the opposite ends of cover member 23 may have attachment/detachment means 104 such as zippers or the like. In this way, it is contemplated that cover member 23 may be a unitary member which can be removed from time-to-time for cleaning and/or replacement. Such a flexible cover member can also minimize the weight of cart 15 and can help enhance the overall comfort of the unit to those being supported and moved thereon. Cover member 23 may comprise a fluid resistant synthetic material such as coated nylon, canvas or the like.

While the present specification and drawings have shown and described preferred embodiments of the extrication cart of the present invention, further modifications and adaptions can be accomplished by those of ordinary skill in the art without departing from the scope of the present invention. Some of these modifications have been mentioned, and others will become apparent to those skilled in the art upon reading this specification and/or implementing the invention. Accordingly, it is not intended that this invention be limited to the structure and function specifically set forth herein, other than in the manner set forth in the claims which follow.

We claim:

1. A personal extrication cart for supporting and restraining a person to facilitate movement of that person from an extrication point, said cart comprising:
   a frame;
   a support surface on said frame for supporting a person to be moved, said support surface having upper and lower faces and a leg support portion and a back support portion defining a longitudinal length with oppositely disposed longitudinal edges, said leg and back support portions having an open use position in which said upper faces are angled relative to each other along said longitudinal length;
   wheel means attached below said support surface for facilitating movement of said cart; and
   means located at least partially below said upper face of said support surface for facilitating rolling of said cart between a transportation position where said wheel means is engaged for movement, and a loading position where said cart is at least partially supported along one of said longitudinal edges for placement of a person onto said support surface.

2. The extrication cart of claim 1, wherein said back support portion comprises a lower edge located adjacent a top edge of said leg support portion, and wherein said back support portion further comprises a recessed area formed adjacent said lower edge to anatomically accommodate a person thereon with both hands of said person situated behind their back and adjacent to said back support portion.

3. The extrication cart of claim 2, wherein said back support portion comprises a peripheral outer edge member which is bent downwardly away from said upper surface adjacent said lower edge to provide said recess.

4. The extrication cart of claim 1, wherein said wheel means comprises at least one wheel rotatably supported below said support surface.

5. The extrication cart of claim 1, wherein said frame comprises a substantially skeletal structure having a peripheral outer edge member, and said support surface is defined at least in part by a cover fitted over said frame.

6. The extrication cart of claim 5, wherein at least a portion of said cover is flexible.

7. The extrication cart of claim 1, further comprising a rotatable connection between said leg and back support portions, whereby said leg and back portions are rotatable between a plurality of positions, one of said positions being said open use position.

8. The extrication cart of claim 7, further comprising means for selectively locking said leg and back support portions in one of said plurality of positions.

9. A wheeled extrication cart for supporting and retaining a person, and which can be rolled between a loading position and a transportation position for wheeled movement, said cart comprising, in combination, a frame having a substantially skeletal peripheral support member with a cover fitted over at least a portion thereof to defining a support surface, said support surface having oppositely disposed longitudinal edges and a relatively planar leg support portion and a back support portion angularly oriented with respect to said leg support portion in use to accommodate a person in effectively seated position, said back support portion having a transverse edge located proximate to said leg support portion and comprising a recessed area formed in said support surface adjacent said lower edge, means attached to said frame below said support surface for providing wheeled movement of said cart in transportation position, and at least one roll shield adjacent said frame for facilitating rolling said cart between a loading position in which said cart is supported at least in part along one of its longitudinal edges, and transportation position wherein said cart is at least partially supported by said wheel means for wheeled movement.

10. The extrication cart of claim 9, further comprising a plurality of adjustable retainer straps for retaining a person on said support surface of said cart.

11. The extrication cart of claim 9, wherein at least a portion of said cover is flexible.

12. The extrication cart of claim 9, further comprising a rotatable connection between said leg and back support portions, whereby said leg and back portions are rotatable between a plurality of angular positions relative to one another.

13. The extrication cart of claim 12, further comprising means for selectively locking said leg and back support portions in one of said plurality of positions.

14. The extrication cart of claim 9, further comprising an at least partially rigid cross member spanning between oppositely disposed portions of said peripheral support member of said frame below said support surface.

15. The extrication cart of claim 9, further comprising an at least partially rigid cross member spanning between oppositely disposed portions of said peripheral support member of said frame below said support surface.

16. A wheeled one person extrication cart which can be rolled between a loading position and a transportation position for support and wheeled movement of passive demonstrators and the like, said cart comprising a frame having a substantially skeletal and at least partially collapsible peripheral support member with a flexible cover fitted over at least a portion thereof and defining a support surface for a person to be extricated, said frame hingedly rotatable between open and collapsed conditions, said support surface having oppositely disposed longitudinal edges and a relatively planar leg support portion and a back support portion angularly oriented with respect to said leg support portion in open condition to accommodate a person in an effectively seated position, said back support portion further comprising a recessed area for anatomically accommodating a person having both hands situated behind their back and adjacent to said back support portion, wheel means for providing wheeled movement of said cart in transportation position, said wheel means attached to said frame below said support surface and comprising a pair of roll shields adjacent said frame and located on opposite sides of said wheel means for facilitating rolling movement of said cart between loading position in which said cart is supported at least in part along one of its longitudinal edges, and transportation position wherein said cart is at least partially supported by said wheel means.

17. The extrication cart of claim 16, further comprising a plurality of adjustable retainer straps for retaining a person on said support surface of said cart.

18. The extrication cart of claim 16, further comprising a rotatable hinge connection between said leg and back support portions, whereby said leg and back portions are rotatable between a plurality of positions, including said open and collapsed conditions.

19. The extrication cart of claim 18, further comprising means for selectively locking said leg and back support portions in one of said plurality of positions.

20. The extrication cart of claim 16, further comprising an at least partially rigid cross member spanning between oppositely disposed portions of said peripheral support member of said frame below said support surface.

* * * * *